Nov. 2, 1971   E. W. ROWLAND-HILL ET AL   3,616,800
AXIAL FLOW TYPE COMBINE WITH A DISCHARGE CONVEYOR
Filed Nov. 24, 1969   3 Sheets-Sheet 1

INVENTORS
EDWARD WILLIAM ROWLAND-HILL
JAMES W. McDUFFIE

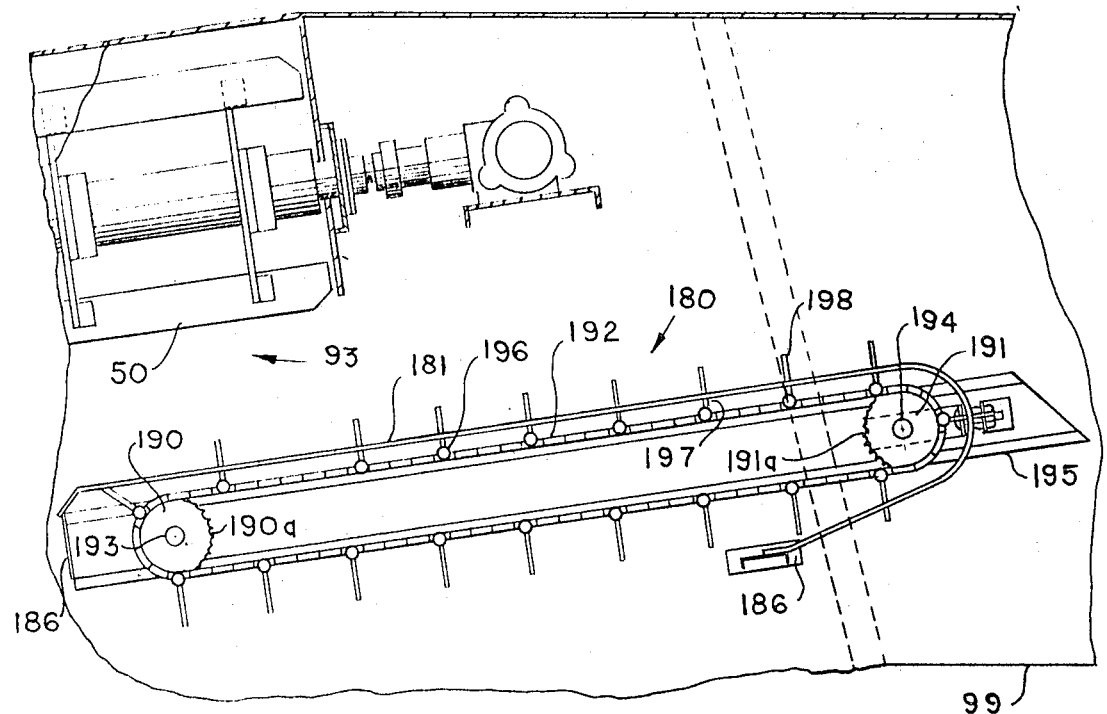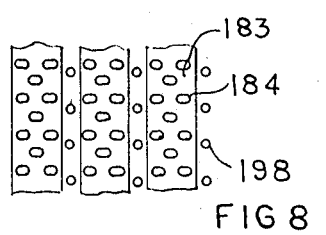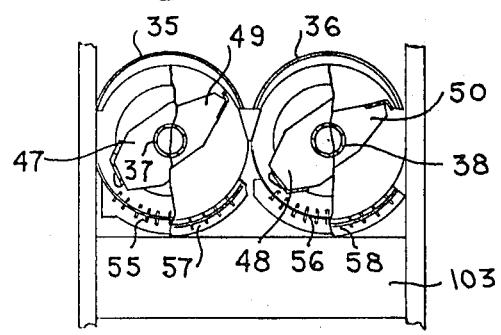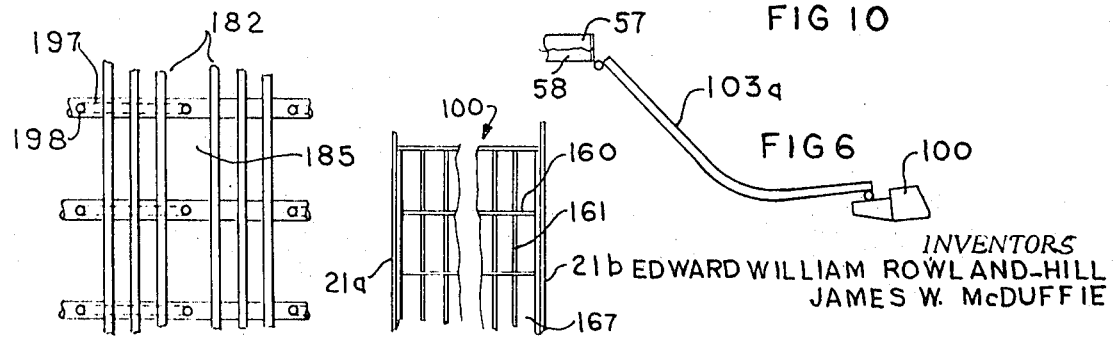

United States Patent Office 3,616,800
Patented Nov. 2, 1971

3,616,800
AXIAL FLOW TYPE COMBINE WITH A DISCHARGE CONVEYOR
Edward William Rowland-Hill and James W. McDuffie, New Holland, Pa., assignors to Sperry Rand Corporation, New Holland, Pa.
Filed Nov. 24, 1969, Ser. No. 879,215
Int. Cl. A01f 7/06
U.S. Cl. 130—27 T                 14 Claims

ABSTRACT OF THE DISCLOSURE

An axial flow type combine has an axial flow threshing and separating means threshing and separating grain from crop material and discharging the crop material onto a conveyor for removal of remaining entrained grain and discharge of the crop material at the rear of the combine.

BACKGROUND OF THE INVENTION

This invention relates to the discharge of threshed crop material from axial flow type combines and is directed particularly to the means for discharging threshed crop material from the rear of the combine with a final separation of any remaining entrained grain.

In combines for threshing and separating grain from the crop material or straw it is desirable to attain a high ratio of the rate of threshing grain to the size and weight of the combine. The separation efficiencies are also important. The grain in the discharged straw of crop material should be at a minimum.

In the axial flow type combine the cut crop is delivered by a crop elevator to a crop feeding means which transfers cut crop to the threshing and separating section of the threshing and separating means. The cut crop is threshed and a substantial majority of the grain is separated in the threshing and separating section. The grain drops through the concaves in threshing and separating section and the threshed crop material is conveyed through the following separating section to remove most of the grain in the straw. The grain is discharged through the separator grates. The grain drops onto grain handling and cleaning means under the threshing and separating means. The straw is conveyed to the rear for discharge.

In the past the threshed crop material, after passing through the separating section of a threshing and separating means or a separator, is discharged directly to ground, or is distributed to the sides by a spreader or removed from the separator by a blower. These various means of removal and discharge of straw or threshed crop material do not take into consideration the entrained grain that remains in the straw mat even after it has been subjected to a thorough separating action. Also, the physical nature of the straw mat varies with different types of crops. Some crops have a denser straw mat than others and grain is more difficult to remove. Additional separating action is necessary.

It is, therefore, desirable to provide an additional separating action in the means for discharging the straw mat so that the remaining grain in the straw mat is recovered.

OBJECTS AND SUMMARY OF THE INVENTION

An object of this invention is to provide a straw mat discharge from an axial flow type combine that has a separating action on the mat.

Another object of the invention is to provide a straw mat discharge means on an axial flow type combine that is light in weight and short.

Another object of the invention is to provide a straw mat discharge that passes debris of at least the same size as that passed by the crop elevator on the front of the combine.

Another object of the invention is to provide a discharge means for an axial flow type combine that improves the overall separation efficiency of the combine.

In summary, an axial flow combine has discharge conveyor means at the end of the threshing and separating means and partially over the grain cleaning means that moves the straw mat over an open lattice type structure and drops grain onto the grain cleaning means.

These and other objects and advantages of this invention will be apparent from the following description and claims taken in conjunction with the accompanying drawings which illustrate the various features of this invention.

BRIEF DESCRIPTION OF THE DRAWINGS

FIG. 5 is a fragmentary top view of the grate.

FIG. 6 is a fragmentary side view of a modification of the chute.

FIG. 7 is a side view of an overshot conveyor.

FIG. 8 is a fragmentary top view of one form of the straw supporting members.

FIG. 9 is a fragmentary top view of another form of the straw supporting members.

FIG. 10 is a cross sectional view taken along lines 10—10 of FIG. 2 illustrating the two units with the threshing rotors fragmentized to show the separating rotors.

DETAILED DESCRIPTION OF THE PREFERRED EMBODIMENT

Introduction

Figure 2:
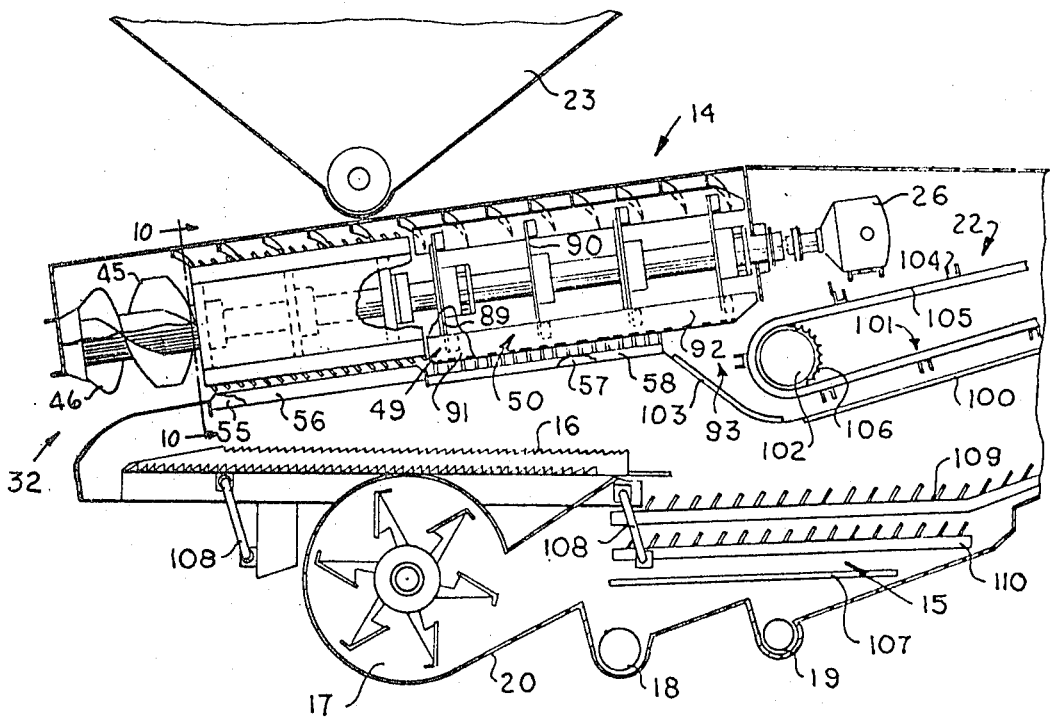
FIG. 2 is a cross sectional view of the threshing and separating means, crop feeding means, grain handling and cleaning means and the discharge conveyor.
Figure 1:
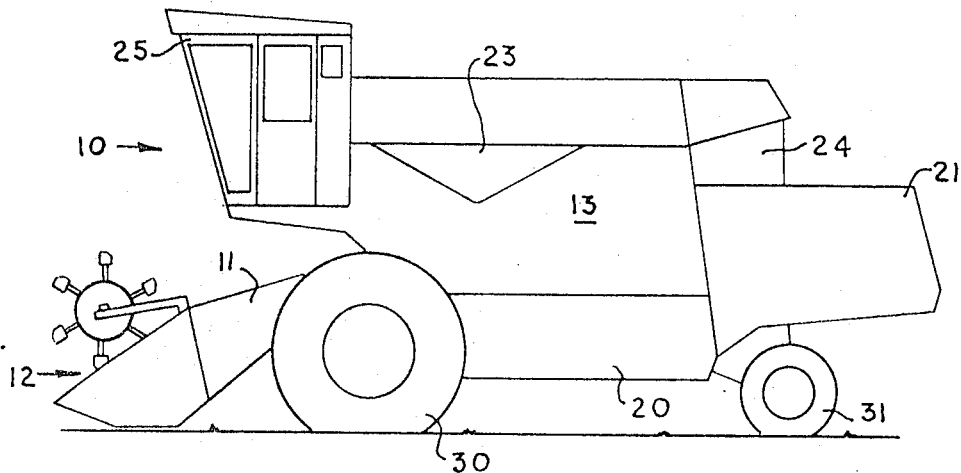
FIG. 1 is a side elevational view of an axial flow type combine.
Figure 3:
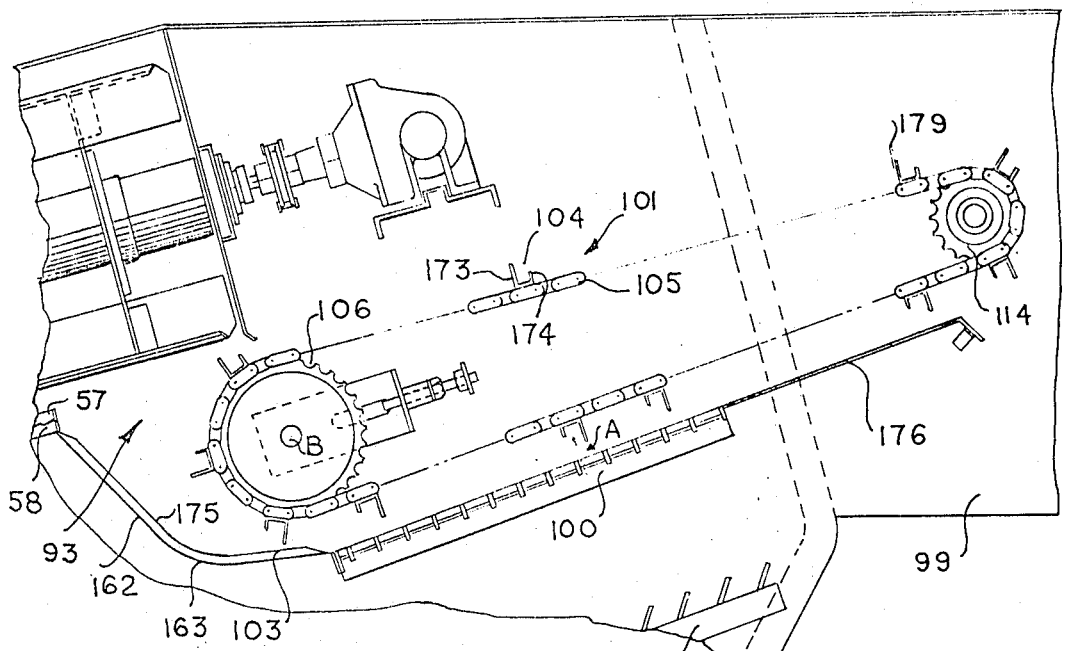
FIG. 3 is a side of the undershot discharge conveyor.
Figure 4:
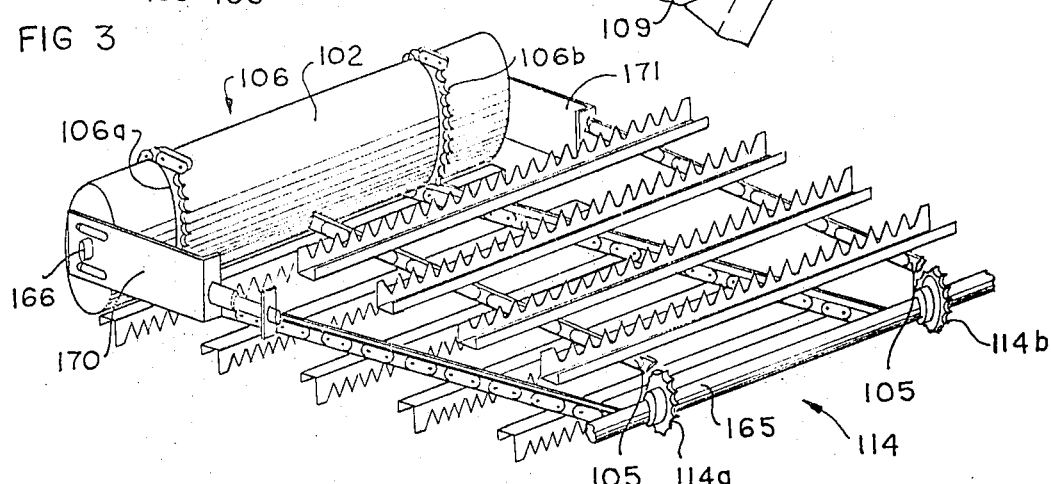
FIG. 4 is a perspective view of the undershot discharge conveyor fragmentarily shown.

In FIG. 1 the combine 10 is exteriorly illustrated with a crop elevator 11 and header 12 mounted on front. The main frame or housing 13 of the combine internally supports the crop threshing and separating means 14, the grain cleaning means 15 and the grain pan 16, shown in FIG. 2. The rear housing 21 encloses the discharge conveyor 22 extending rearwardly from the threshing and separating means. On top of the combine is the grain tank 23 and the internal combustion engine 24 positioned to the rear of the tank. The blower 17, grain auger 18 and tailings auger 19 are enclosed in the lower housing 20 underneath the main frame or housing 13. The operator's cab 25 extends forwardly from the main housing 13 and over the crop elevator 11 for a clear view of the header 12. The combine is conventionally supported by two large drive wheels 30 on front and two small steering wheels 31 on the rear.

The threshing and separating means 14 extends longitudinally in the direction of movement of the combine and has the crop feeding means 32 at the front for receiving crop from the header and elevator. The crop is then carried axially and circumferentially to thresh and separate the grain from the crop material and discharge the threshed crop material at the rear to a conveyor which carries the threshed crop material rearwardly for discharge from the combine. In FIGS. 3 to 6 an undershot discharge conveyor is shown and in FIGS. 7 to 9 an overshot discharge conveyor is shown.

In this preferred embodiment the threshing and separating means is described as two units in adjacent side by side relation. However, the invention described and shown in this embodiment is equally applicable to a single threshing and separating unit.

Crop feeding means and threshing and separating means

The threshing and separating means is two units comprising two generally cylindrical casing means 35, 36 with rotatable shafts 37, 38, respectively, threshing rotors 47, 48 and separating rotors 49, 50, respectively, to form with concaves 55, 56 and grates 57, 58, respectively, in the casing means, threshing and separating sections. The threshing rotors 47, 48 sweep across concaves to thresh and separate grain. The separated grain passes through the concaves onto the grain pan 16 and the remaining crop material also referred to as straw passes to the separating rotors on the shafts, respectively. The separating rotors have blades 91, 92 on spiders 89, 90. The blades repeatedly draw the straw mat across the grates, respectively, to remove grain lodged in the straw mat. The grates 57, 58 end short of the casing means to provide an opening 93 in the bottoms for discharging the straw mats to the undershot discharge conveyor. The separating rotors extend beyond the grates and over the opening to form discharge sections to the two units. The shafts 37, 38 are driven by transmissions 26.

The crop feeding means at the front comprises two auger means 45, 46 on the shafts 37, 38, respectively. A sloped ramp means 113 extends downwardly and forwardly to receive the cut crops from the crop elevator 11 and guides the crops into mid-portions of the auger means for delivery to the threshing and separating sections.

Grain handling and cleaning means

The grain pan 16 is underneath the concaves 55, 56 and grates 57, 58 to receive the separated grain and chaff from the threshing and separating means. The grain is discharged onto the chaffer sieve 109 where the grain and chaff are separated with the grain dropping onto the grain sieve 110 for separation from the grain tailings. The light chaff is rendered airborne by the blower 17 and the heavier chaff shaken off the end of the chaffer sieve onto the ground through the rear opening 99 in the combine. Clean grain passes through the sieve onto the grain chute 107 and the tailings are agitated off the rear edge. The grain collects in the grain auger for deposit in the grain tank and the tailings in the tailings auger for return to the threshing and separating means.

Undershot discharge conveyor

The undershot conveyor 22 generally comprises a grate 100, a chute 103, and an endless conveyor 101 with front and rear sprocket means 106, 114. The grate is planar and comprises a plurality of transverse straight bars 160 mounted on longitudinally extending straight beams 161 to form rectangular shaped openings or perforations 167. The grate extends across the width of the rear housing 21 and is mounted on the side walls 21a, 21b thereof. It extends rearwardly to the opening 99 and the end of the chaffer sieve. A metal shelf 176 extends rearwardly from the end of the grate 100 to carry the straw further rearwardly clear of the chaffer sieve and discharge to ground from the rear end of the metal shelf. The attachment of the grate 100 to the side walls may be adjustable for different spacings A between the conveyor and the grate and for different angular positions between the grate and the conveyor. Preferably the spacing A should narrow in the rearward direction.

The solid curved chute 103 has a straight portion 162 extending downwardly from the ends of the separator grates to a curved portion 163 bending the chute underneath the front sprocket means 106. The front end of the grate 100 commences at the axis B of rotation of the front sprocket means 106. The chute 103 may be fastened to the front end of the grate and the rear end of the separating grates 57, 58 (FIG. 6) or may be hingedly mounted on the rear ends of the separator grates and rest on projections 164 extending forwardly from the discharge grate 100. This latter form permits the chute to yield to oversize amounts of crop material or debris. The firm attachment of the chute, however, is preferred. The spacing between the grate and chain conveyor is about the same as the spacing of the crop conveyor and bottom wall of the crop elevator.

The endless conveyor comprises two chains 105 mounted on front and rear sprocket means 106, 114. The rear sprocket means 114 has a transverse shaft 165 rotatably in the sides 21a, b of the rear housing. Two sprockets 114a, b are spaced axially near the ends of the shaft 165 and are mounted to rotate with the shaft. The chains 105 engage and are supported by the sprockets 114a, b. The front sprocket means 106 has a drum 102 mounted on the shaft 166 supported in the adjustable plates 170, 171 along the respective sides of the main frame. The shaft 166 and drum 102 have the axis of rotation B about and underneath the rear wall 172 of the threshing and separating units. The front sprockets have a larger diameter than the rear sprockets and are mounted on and rotate with the drum. The chains mesh with the sprockets 106a, b respectively. The front sprockets are axially spaced the same distance as the rear sprockets to transversely space the chains in parallel relation.

The rods 104 extend transversely and are attached to the chains 105 to form the endless conveyor 101. The bars are U-shape and have a leading side 173 and a trailing side 174. Both sides are substantially normal to the line of travel and project perpendicularly from the chains. The leading side is serrated. The trailing side has a smooth edge and is narrower than the leading side. The drum is positioned close to the rear wall 172 of the units with sufficient space for the chain and bars to pass. The spacing A between the chains and the grates is sufficient to pass the rods and the straw mat. The drum 102 overlaps only a portion of the opening 99 at the end of the separator grate. The sharply sloped portion 162 of the chute and the cylindrical surface of the drum 102 are spaced and form a passage for the straw. The passage between the drum and the chute narrows downwardly towards the grate. The chute has longitudinal extending ribs or fins 175 normal to the chute for linearly guiding the straw between the conveyor and the grate. The rods 104 sweep downwardly and grasp the straw mat and drag it longitudinally across the transverse bars 160 to agitate and shake the straw as it is drawn across the bars 160. Any remaining entrained grain is dislodged and falls through the openings 167 in the grate onto the latter half of the chaffer sieve. The grain passes to the grain sieve 110, grain chute 107 to the grain auger 18. Thus this remaining entrained grain is recovered.

Resilient strips 179 of rubber or other suitable material are attached to the rods 104. The strips extend across the width of the grate and bars and extend away from the chains to form a wiping or brushing means to sweep along the grate. This sweeping action removes straw that becomes enlarged on the grate or caught in the openings. This straw mat may not be removed by the action of the mat of crop material as it is drawn across the grate for discharge. Thus the resilient strips prevent an accumulation of straw on the grate by sweeping clean for each complete travel or turn of the chain conveyor.

In another form of the mounting of the grate instead of fixedly securing the grate to the sides it may be hingedly mounted at the front and resiliently supported at the rear. This will permit the grate to move up and down for better separation or increase the spacing A on a large wad of crop material or a large piece of debris to pass. The up and down motion may also be produced by a rotating cam. Either the front or rear sprocket means may drive the chains. However, it is preferable to drive by the rear sprocket means.

Overshot conveyor

The overshot conveyor 180 extends from underneath the opening 93 at the end of the threshing and separating means and rearwardly over the bottom opening 99 in the rear housing 21. The straw mat is discharged onto the stationary longitudinally extending straw supporting members 181. The straw supporting members 181 extend from immediately below the ends of the separator grates rearwardly into the rear housing and over the opening 99. The endless conveyor 180 draws or pulls the straw along the supporting members.

These supporting members may be wires 182 (FIG. 9) formed into sets of three wires separated by longitudinal spaces 185. The three wires of a set are spaced to pass the grain and prevent accumulation of grain on these straw supporting members. The straw supporting members 181 may also be metal channel shaped strips 183 (FIG. 8) with perforations 184 for passing the grain and separated by longitudinal spaces. The wires and strips are mounted on a forward transverse beam secured to the main frame or housing 13 and to the rearward transverse beam 186 forward of the discharge end and underneath the endless conveyor. The wires 182 and metal strips 183 are stiff and extend longitudinally along the conveyor and around the discharge end to the transverse beam 187. Thus the supporting members 181 are mounted to carry the straw for discharge.

The endless conveyor 180 comprises front and rear sprocket means 190, 191 and two chains 192 mounted on the sprocket means. The front and rear sprocket means have shafts 193, 194, respectively, rotatably mounted in stiffening beams 195 on the side walls of the main 13 and rear housings 21. Sprockets 190a, 191a meshing with the chains are, respectively, affixed to the shafts. Transverse rods 196 are attached to the chains and spaced along the chains. U-shaped members 197 are mounted on the rods and have fingers 198 extending through the longitudinal spaces 185 between the sets of wires and metal strips and above the fingers pull the straw mat to the rear. The rear curvature of the wires and strips is at the center of the rear shaft 194 and conforms to the sprockets 191a and path of the fingers. Below the endless conveyor the support members are at an angle to the conveyor so that the fingers recess within or behind the wires and strips. These angle portions of the support members pull the straw away from the fingers that is carried around underneath the conveyor. The rear housing encloses the conveyor while the straw falls to the ground through the bottom opening 99. Either the front sprocket or rear sprocket means may be the driving sprocket means.

Summary of advantages and features of the invention

It is seen from the foregoing description that the endless conveyor, supporting members and grate of the two embodiments have open lattice structures through which the grain passes for recovery to the chaffer sieve. The undershot conveyor has a grate with openings and the overshot conveyor has open supporting members and a conveyor structure of spaced members permitting the passage of grain. The additional separation is attained by the rods and grates of the undershot conveyor and the fingers and supporting members of the overshot conveyor. This agitation and reorientation dislodges the small amount of the remaining grain in the straw. This may only be a small percentage of the grain in the order of 5% or less but it is significant in reducing grain loss to very small percentages such as 1% or less. The conveyors overlap the chaffer sieve and the bottom opening to drop the separated grain within the main casing of the combine onto the chaffer sieve and dropping the straw onto the ground.

The straw mat has a generally spiral path in the threshing and separating means. The discharge to the conveyor reorientates the straw releasing entrapped grains. The conveyor functions as an auxiliary separator which imparts a greater versatility in types and conditions of crops processed with a maximum separation efficiency. The grain loss is well below the maximum grain loss standards recommended for agricultural equipment. This high threshing capacity and low grain loss is attained with lighter and smaller conventional equipment having a comparable capacity. The conveyors contribute this. They are light in weight and of a length to fit well within acceptable dimensions for combines.

Of the two embodiments the undershot conveyor is preferred. The conveyor is closer to the threshing and separating units since the straw passes underneath the endless conveyor. In the overshot conveyor space is required between the threshing and separating units and the endless conveyor in order to pass the straw. Thus the threshing and separating units are higher. However, both conveyors still provide a combine that has a low height. This feature permits greater versatility in the placement of the grain tank, engine and other components.

While the invention has been described, it will be understood that it is capable of further modifications and this application is intended to cover any variations, uses, or adaptations of the invention following in general, the principles of the invention and including such departures from the present disclosures as come within known or customary practice in the art to which the invention pertains, and as may be applied to the essential features hereinbefore set forth and as fall within the scope of the invention or the limits of the appended claims.

Having thus described our invention, what we claim is:
1. A mobile axial flow combine comprising
   a housing with a rear discharge opening for passing chaff and threshed crop material to ground,
   axial flow threshing and separating means extending fore-and-aft in said housing and having a generally cylindrical casing with concave means and grate means in the bottom thereof and rotor means for spirally rotating crop material in said casing across said concave means and grate means to separate grain from the crop material and carry the crop material rearwardly for discharge, discharge opening in the bottom of said casing at the rear end of said grate means,
   grain handling and cleaning means in said housing and underneath said axial flow threshing and separating means and extending rearwardly to the rear discharge opening for discharge of chaff and debris,
   a discharge conveyor at its forward end being underneath said discharge opening of said casing for receiving threshed crop material and being above and extending rearwardly beyond said grain handling and cleaning means, said conveyor having chute means extending downwardly and rearwardly from said grate underneath said discharge opening for deflecting the threshed crop material rearwardly and open-type means for supporting threshed crop material and means for moving the threshed crop material in cooperation with said open-type means to dislodge entrained grain through said open-type means for recovery with the grain passed through said concaves and grates and discharge threshed crop material from the combine.
2. A mobile axial flow combine as set forth in claim 1, wherein said open-type means is a grate having openings therethrough and said crop moving means is an endless conveyor above said grate having means for drawing crop material across said grate to dislodge entrained grain from the crop material and said openings passing the dislodged grain.
3. A mobile axial flow combine as set forth in claim 2, wherein said endless conveyor has wiping means sweeping across said grate to clear retained crop material.

4. A mobile axial flow combine as set forth in claim 3, wherein said wiping means is a resilient strip attached to said drawing means.

5. A mobile axial flow combine as set forth in claim 2, wherein said endless conveyor comprises front and rear sprocket means, endless chain-like means mounted on said sprocket means, rod-like means mounted on said chain-like means transverse to the movement of said conveyor and chute means transverse to said movement and extending between said grate means and said grate to guide said crop material to said front sprocket means.

6. A mobile axial flow combine as set forth in claim 5, wherein said front sprocket means has a drum within endless chain-like means and said chute means slopes downwardly towards said drum to form a converging passage towards said grate.

7. A mobile axial flow combine as set forth in claim 6, wherein said chtue means and drum have solid surfaces.

8. A mobile axial flow combine as set forth in claim 5, wheerin said chute means is pivotally attached to said grate means and detachably mounted to said grate to permit said chute means to yield to oversize amounts of crop material or debris.

9. A mobile axial flow combine as set forth in claim 1, wherein said open-type means is beneath said crop moving means.

10. A mobile axial flow combine as set forth in claim 9, wherein said open-type means is pivotally mounted adjacent said threshing and separating means and adjustably mounted adjacent the discharge end of said grate to vary the spacing between said open-type means and said crop moving means.

11. A mobile axial flow combine as set forth in claim 1, wherein said open-type means is above said crop moving means and said crop moving means is of an open type to permit passage of grain therethrough.

12. A mobile axial flow combine as set forth in claim 11, wherein said open type means are longitudinally extending means with openings therein and transversely spaced and said crop moving means extend between said longitudinally extending means to draw and agitate threshed crop material thereon.

13. A mobile axial flow combine as set forth in claim 12, wherein said longitudinally extending means are spaced longitudinally extending strips with perforations therein and said crop moving means are fingers extending between said strips.

14. A mobile axial flow combine as set forth in claim 12, wherein said longitudinal extending means are a plurality of spaced apart sets of longitudinally extending parallel wires and said crop moving means are fingers extending between said sets.

References Cited
UNITED STATES PATENTS

| | | | |
|---|---|---|---|
| 2,363,632 | 11/1944 | Weaver | 130—27 T |
| 831,420 | 9/1906 | Dunkelberger | 130—27 H |
| 1,098,560 | 6/1914 | Cummings | 130—21 |
| 3,534,742 | 10/1970 | Knapp | 130—27 T |

ANTONIO F. GUIDA, Primary Examiner